United States Patent
Morrish

(10) Patent No.: US 8,368,370 B2
(45) Date of Patent: Feb. 5, 2013

(54) CONTROLLER COMPENSATION FOR FREQUENCY JITTER

(75) Inventor: Andrew John Morrish, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 271 days.

(21) Appl. No.: 12/615,962

(22) Filed: Nov. 10, 2009

(65) Prior Publication Data

US 2011/0110126 A1  May 12, 2011

(51) Int. Cl.
- G05F 1/00 (2006.01)
- H02M 3/335 (2006.01)
- H03K 7/08 (2006.01)

(52) U.S. Cl. ........ 323/282; 363/21.12; 327/175

(58) Field of Classification Search ........ 323/282, 323/283, 284, 285, 288; 363/21.05, 21.09, 363/21.12, 21.13, 21.17; 327/175
See application file for complete search history.

(56) References Cited

U.S. PATENT DOCUMENTS

| | | | | |
|---|---|---|---|---|
| 6,084,452 A | * | 7/2000 | Drost et al. | 327/175 |
| 6,477,067 B1 | * | 11/2002 | Kerkman et al. | 363/41 |
| 6,542,015 B2 | * | 4/2003 | Zhou et al. | 327/172 |
| 7,026,851 B2 | * | 4/2006 | Yang et al. | 327/172 |
| 7,208,921 B2 | * | 4/2007 | Walters | 323/222 |
| 7,525,358 B1 | * | 4/2009 | Taft et al. | 327/175 |
| 7,586,298 B2 | * | 9/2009 | Tabaian et al. | 323/288 |
| 7,906,941 B2 | * | 3/2011 | Jayaraman et al. | 323/222 |
| 2002/0047630 A1 | * | 4/2002 | Kastner | 315/291 |
| 2008/0129265 A1 | * | 6/2008 | Rosenthal | 323/283 |
| 2010/0033146 A1 | * | 2/2010 | Irissou et al. | 323/282 |

* cited by examiner

Primary Examiner — Gary L Laxton
Assistant Examiner — Zekre Tsehaye
(74) Attorney, Agent, or Firm — Blakely Sokoloff Taylor & Zafman LLP

(57) ABSTRACT

An example controller for use in a power supply in accordance with the present teachings includes a drive signal generator, a jitter signal generator and a compensator signal generator. The drive signal generator is coupled to output a drive signal having a switching period and a duty ratio to control switching of a switch that is to be coupled to the controller. The jitter signal generator is coupled to provide a jitter signal, where the switching period of the drive signal varies in response to the jitter signal. The compensator signal generator is coupled to provide a compensator signal responsive to the jitter signal, where the duty ratio of the drive signal is varied in response to the compensator signal.

18 Claims, 7 Drawing Sheets

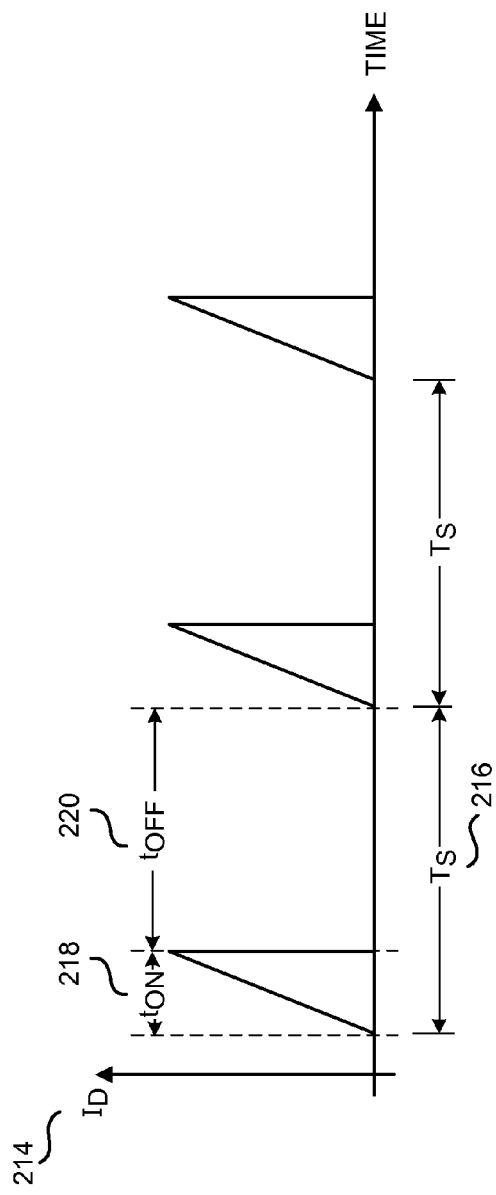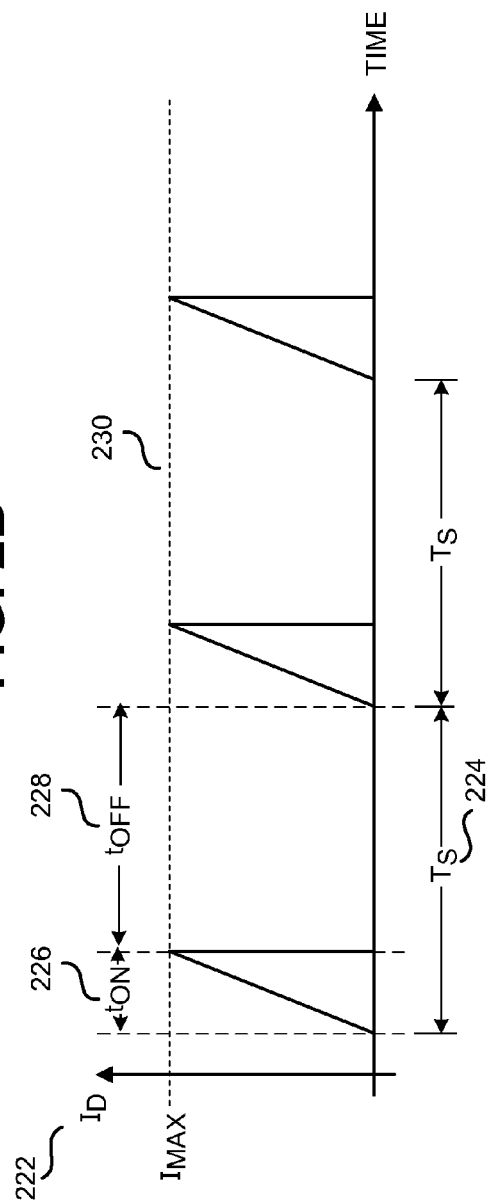

CONTROLLER COMPENSATION FOR FREQUENCY JITTER

TECHNICAL FIELD

The present invention relates generally to power supplies, and more specifically, the present invention relates to controllers for switched mode power supplies.

BACKGROUND INFORMATION

Electronic devices use power to operate. Switched mode power supplies are commonly used due to their high efficiency, small size and low weight to power many of today's electronics. Conventional wall sockets provide a high voltage alternating current. In a switching power supply a high voltage alternating current (ac) input is converted to provide a well regulated direct current (dc) output through an energy transfer element. The switched mode power supply control circuit usually provides output regulation by sensing the output and controlling it in a closed loop. In operation, a switch is utilized to provide the desired output by regulating the duty cycle (typically the ratio of the on time of the switch to the total switching period) of the switch in a switched mode power supply.

Due to regulatory requirements, the electromagnetic interference (EMI) emissions of a power supply can not exceed a suitable level. The EMI emissions of the power supply are partly due to the switching noise and the switching frequency of the power supply. Various techniques may be utilized to reduce the EMI emissions of the power supply, particularly the magnitude of the EMI emissions of the power supply. In one example, the EMI can be reduced with snubbers and input filters. In another example, frequency jittering is utilized to spread the energy in the harmonics of the switching frequency to reduce the magnitude of some types of EMI emissions. However, in power supplies operating in discontinuous conduction mode (DCM), the frequency jittering creates an undesirable ripple at the output of the power supply.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2B is a diagram illustrating an example switching current waveform of a switching power supply utilizing pulse width modulation (PWM) duty ratio programmed control and operating in DCM in accordance with an embodiment of the present invention.

FIG. 2C is a diagram illustrating an example switching current waveform of a switching power supply utilizing pulse width modulation (PWM) current programmed control and operating in DCM in accordance with an embodiment of the present invention.

DETAILED DESCRIPTION

Embodiments of controller compensation for frequency jitter are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

For combating EMI emissions, the Federal Communications Commission (FCC) has established specifications which specify the maximum amount of EMI which can be produced by classes of electronic devices. Power supplies generate a major component of EMI emissions and minimizing the amount of EMI produced by a power supply is an important step in designing the power supply. Methods such as frequency jittering spread the energy in the harmonics of the switching frequency of the power supply over a wider frequency range to reduce the magnitude of some types of EMI emissions. However, for PWM power supplies operating in discontinuous conduction mode (DCM), frequency jittering produces variations in the output voltage of the power supply since the output voltage partially depends on the switching frequency of the power supply.

For power supplies operating in DCM, the unwanted variations in the output voltage may be corrected by the regulation provided by the feedback circuit. However, when the feedback circuit is the sole mechanism to reduce the undesirable effects of the jitter, the amount of frequency jitter which could be implemented is limited. Thus, embodiments of the present invention compensate for the frequency jittering within the controller such that the unwanted variations in the output voltage are reduced.

Figure 1:
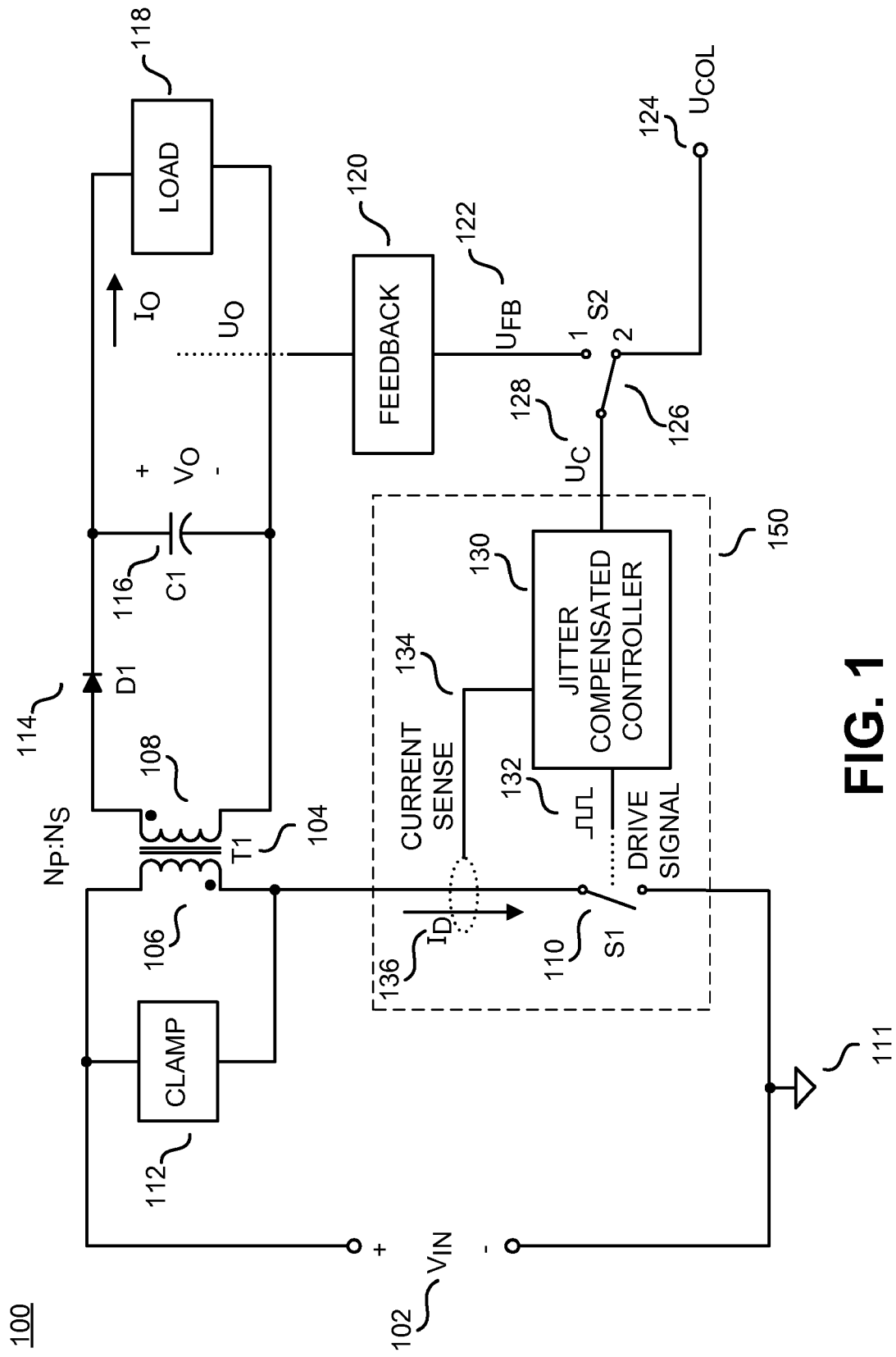
FIG. 1 is a functional block diagram illustrating an example switching power supply utilizing a controller in accordance with an embodiment of the present invention.

Referring first to FIG. 1, a functional block diagram of an example switching power supply 100 is illustrated including input $V_{IN}$ 102, an energy transfer element T1 104, a primary winding 106 of the energy transfer element T1 104, a secondary winding 108 of the energy transfer element T1 104, a switch S1 110, an input return 111, a clamp circuit 112, a rectifier D1 114, an output capacitor C1 116, a load 118, an output quantity $U_O$, an output voltage $V_O$, an output current $I_O$, a feedback circuit 120, a feedback signal $U_{FB}$ 122, a constant open loop signal $U_{COL}$ 124, a switch S2 126, a controller input $U_C$ 128, a jitter compensated controller 130, a drive signal 132, a current sense input 134, and switch current $I_D$ 136. The example switching power supply 100 illustrated in FIG. 1 is configured generally as a flyback regulator, which is one example of a switching power supply topology which may benefit from the teachings of the present invention. However, it is appreciated that other known topologies and configurations of switching power supply regulators may also benefit from the teachings of the present invention.

The switching power supply 100 provides output power to the load 118 from an unregulated input $V_{IN}$ 102. Typically the input $V_{IN}$ 102 is a rectified and filtered ac line voltage. The input $V_{IN}$ 102 is coupled to the energy transfer element T1 104. In some embodiments of the present invention the energy transfer element T1 104 may be a coupled inductor. In other embodiments of the present invention the energy transfer element T1 104 may be a transformer. In the example of FIG. 1, the energy transfer element T1 104 includes two windings, a primary winding 106 and a secondary winding 108 with $N_P$ number of turns for the primary winding 106 and $N_S$ number of turns for the secondary winding 108. However, it should be appreciated that the energy transfer element T1 may have more than two windings. The primary winding 106 is further coupled to the switch S1 110, which is then further coupled to the input return 111. In addition, the clamp circuit 112 is coupled across the primary winding 106 of the energy transfer element T1 104. The secondary winding 108 of the energy transfer element T1 104 is coupled to the rectifier D1 114. In the example of FIG. 1, the rectifier D1 114 is exemplified as a diode. However, in some embodiments the rectifier D1 114 may be a transistor used as a synchronous rectifier. Both the output capacitor C1 116 and the load 118 are coupled to the rectifier D1 114. An output is provided to the load 118 and may be provided as either an output voltage $V_O$, output current $I_O$, or a combination of the two.

In addition, the switched mode power supply 100 further comprises circuitry to regulate the output which is exemplified as output quantity $U_O$. In general, the output quantity $U_O$ is either an output voltage $V_O$, output current $I_O$, or a combination of the two. A feedback circuit 120 is coupled to sense the output quantity $U_O$ from the output of the power supply 100 and produces the feedback signal $U_{FB}$ 122. The feedback circuit 120 is coupled to switch S2 126. When the switch S2 126 is in position one, the feedback circuit 120 is coupled to one terminal of the jitter compensated controller 130, and the controller input $U_C$ 128 is the feedback signal $U_{FB}$ 122. When the switch S2 126 is in position 2, one terminal of the jitter compensated controller 130 is coupled to the constant open loop signal $U_{COL}$ 124, and the controller input $U_C$ 128 is the constant open loop signal $U_{COL}$ 124. The jitter compensated controller 130 further includes a terminal for the current sense input 134. The current sense input 134 senses the switch current $I_D$ 136 in switch S1 110. In addition, the switch S1 110 receives the drive signal 132 from the jitter compensated controller 130.

In operation, the switched mode power supply 100 of FIG. 1 provides output power to the load 118 from an unregulated input $V_{IN}$ 102. The switched mode power supply 100 utilizes the energy transfer element T1 104 to transfer the voltage from the input $V_{IN}$ 102 between the primary 106 and secondary 108 windings. The clamp circuit 112 is coupled to the primary winding 106 to limit the maximum voltage on the switch S1 110. Switch S1 110 is opened and closed in response to the drive signal 132 received from the jitter compensated controller 130. It is generally understood that a switch that is closed may conduct current and is considered on, while a switch that is open cannot conduct current and is considered off. In some embodiments, the switch S1 110 may be a transistor and the jitter compensated controller 130 may include integrated circuits and/or discrete electrical components. In one example, controller 130 and switch 110 could form part of an integrated circuit 150 that could be manufactured as a hybrid or monolithic integrated circuit. In operation, the switching of switch S1 110 produces a pulsating current at the rectifier D1 114. The current in the rectifier D1 114 is filtered by output capacitor C1 116 to produce a substantially constant output voltage $V_O$, output current $I_O$, or a combination of the two at the load 118. However, systems that utilize frequency jitter to modulate the switching frequency to reduce EMI emissions without jitter compensation according to embodiments of the present invention may produce an undesired variation at the output.

The power supply 100 illustrated in FIG. 1 may operate in either open loop or closed loop operation. However, it should be appreciated that the open loop operation is shown for illustration purposes. In practice, the power supply 100 will operate in closed loop operation. In closed loop operation, the switch S2 126 is in position one and the output quantity $U_O$ is sensed and regulated. In general, the output quantity $U_O$ is either an output voltage $V_O$, output current $I_O$, or a combination of the two. The feedback circuit 120 senses the output quantity $U_O$ from the output of the power supply 100 to provide the feedback signal $U_{FB}$ 122 to the jitter compensated controller 130. When the switch S2 126 is in position one, the controller input $U_C$ 128 is the feedback signal $U_{FB}$ 122. In open loop operation, the switch S2 126 is in position two and the controller input $U_C$ 128 is the constant open loop signal $U_{COL}$ 124. The constant open loop signal $U_{COL}$ 124 may in one example be a constant voltage or in another example may be a constant current. In general, the controller input $U_C$ 128 is either a voltage signal or a current signal. In the example of FIG. 1, the jitter compensated controller 130 also receives another input from the current sense input 134 which relays the sensed switch current $I_D$ 136 in the switch S1 110. The switch current $I_D$ 136 may be sensed in a variety of ways, such as for example the voltage across a discrete resistor or the voltage across a transistor when the transistor is conducting.

When the switch S2 is in position 1, the jitter compensated controller 130 outputs a drive signal 132 to operate the switch S1 110 in response to various system inputs to substantially regulate the output quantity $U_O$ to the desired value. In one embodiment, the drive signal 132 may be a rectangular pulse waveform with varying lengths of logic high and logic low sections, with a logic high value corresponding to a closed switch and a logic low corresponding to an open switch. As mentioned above, systems that utilize frequency jitter to modulate the switching frequency to reduce EMI emissions without jitter compensation according to embodiments of the present invention may produce an undesired variation at the output especially when the power supply is operating in discontinuous conduction mode (DCM). The jitter compensated controller 130 compensates for the frequency modulation to negate the variations in the output of the power supply 100.

Figure 2A:
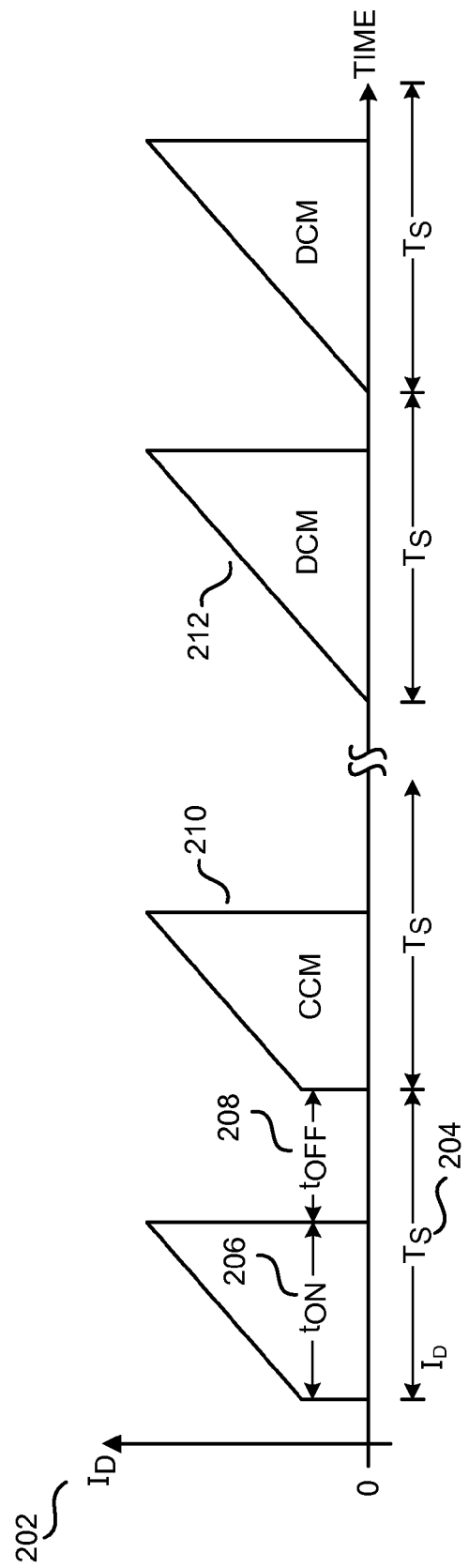
FIG. 2A is a diagram illustrating an example switching current waveform of a switching power supply operating in continuous conduction mode (CCM) and discontinuous conduction mode (DCM) in accordance with an embodiment of the present invention.

The switching current of various modes of operation is illustrated in FIG. 2A. A diagram of an example switching current waveform of the switched mode power supply of FIG. 1 is illustrated including switching period $T_S$ 204, a switch on-time $t_{ON}$ 206, a switch off-time $t_{OFF}$ 208, trapezoidal shape 210 and triangular shape 212. FIG. 2A illustrates the general waveforms of the switch current $I_D$ 202 with respect to time when the controller is operating in both continuous conduction mode (CCM) and discontinuous conduction mode (DCM). In one example, the general waveforms of switch current $I_D$ 202 represent the switch current $I_D$ 136 illustrated in FIG. 1.

During any switching period $T_S$ 204, switch S1 110 may conduct in response to the drive signal 132 from the controller 130 to regulate the output quantity $U_O$. The switching period $T_S$ 204 may be separated into two sections of time: switch on-time $t_{ON}$ 206 and switch off-time $t_{OFF}$ 208. Switch on-time $t_{ON}$ 206 denotes the portion of the switching period $T_S$ 204 where the switch S1 110 may conduct. Switch off-time $t_{OFF}$ 208 denotes the remaining portion of the switching period $T_S$ 204 when the switch S1 110 cannot conduct. The current waveform of FIG. 2A illustrates two fundamental modes of operation. The trapezoidal shape 210 is characteristic of continuous conduction mode (CCM) whereas the triangular shape 212 is characteristic of discontinuous conduction mode (DCM). During CCM, the switch current $I_D$ 202 is substantially non-zero immediately after the start of the switch on-time $t_{ON}$ 206. At DCM, the switch current $I_D$ 202 is substantially zero immediately after the beginning of the switch on-time $t_{ON}$ 206. During the switch off-time $t_{OFF}$ 208, the switch current $I_D$ 202 is substantially zero for both CCM and DCM.

During DCM, the output power is related to various power supply characteristics, such as the switching period $T_S$ 204 or the switching frequency $f_S$ of the switched mode power supply. It should be appreciated that the switching period $T_S$ 204 is the reciprocal of the switching frequency $f_S$ and vice versa, or mathematically: $T_S=1/f_S$. When frequency jittering of the switching frequency $f_S$ is utilized to reduce EMI emissions, the resultant frequency modulation also carries over to the output power. In other words, modulation of the switching frequency $f_S$ also results in a ripple at the output of the switched mode power supply. For a flyback converter (as shown in FIG. 1) operating in DCM, the output power $P_{OUT}$ can be given by:

$$P_{OUT} = \frac{1}{2} L I_{PEAK}^2 f_S, \qquad (1)$$

where $I_{PEAK}$ is the peak value of the current through the primary winding 106, $f_S$ is the switching frequency and L is the inductance of the primary winding 106 of energy transfer element T1 104. For the flyback converter of FIG. 1, $I_{PEAK}$ is also the peak value of the switch current $I_D$ 136. As mentioned above, the switching period $T_S$ 204 is the reciprocal of the switching frequency $f_S$ and equation (1) may be rewritten in terms of the switching period, $T_S$:

$$P_{OUT} = \frac{1}{2} \frac{L I_{PEAK}^2}{T_S} \qquad (2)$$

When frequency jittering is utilized and the switching period $T_S$ is modulated by a small amount, $\delta(t)$ (herein also referred to as the jitter fraction) then the output power $P_{OUT}$ is given by:

$$P_{OUT} = \frac{1}{2} \frac{L I_{PEAK}^2}{(T_S + T_S \delta(t))} \qquad (3)$$

The jitter fraction $\delta(t)$ represents the percentage amount to modulate the switching period $T_S$. In general, the jitter fraction is referenced as $\delta(t)$ to denote that the jitter fraction $\delta(t)$ is a function of time where t is time. The switching period $T_S$ is modulated by the jitter fraction $\delta(t)$ and the modulated switching period $T_S$, $T_S+T_S\delta(t)$, also changes with time t. In some embodiments the magnitude of the jitter fraction $\delta(t)$ may be a value between zero and one, representing the percentage amount to modulate the switching period $T_S$ 202, or mathematically: $0 < |\delta(t)| \leq 1$. In some embodiments of the present invention, the jitter fraction $\delta(t)$ is utilized to reduce EMI emissions of a switched mode power supply. The output voltage $V_O$ for a resistive load of the switched mode power supply may be given by:

$$V_O = \frac{N_S}{N_P} \sqrt{\frac{R L I_{PEAK}^2}{2 T_S (1 + \delta(t))}}, \qquad (4)$$

where R represents the resistance of the load 118. Equation (4) may be rewritten:

$$V_O = I_{PEAK} \frac{N_S}{N_P} \sqrt{\frac{R L}{2 T_S (1 + \delta(t))}} \qquad (5)$$

However, for a typical converter in DCM, the peak current $I_{PEAK}$ may also be given by:

$$I_{PEAK} = \frac{V_{IN} D T_S}{L}, \qquad (6)$$

where $V_{IN}$ 102 is the input voltage and D is the duty ratio. In addition, $DT_S$ is also the switch on-time $t_{ON}$ 206 since the duty ratio D is the ratio of switch on-time $t_{ON}$ 206 to the total switching period $T_S$ 204. However, when frequency jittering is utilized to modulate the switching period $T_S$ 204 by the jitter fraction $\delta(t)$ with the controller 130 utilizing duty ratio programmed control, the peak current $I_{PEAK}$ will also vary as demonstrated:

$$I_{PEAK} = \frac{V_{IN} D T_S (1 + \delta(t))}{L} \qquad (7)$$

As illustrated by equations (3) and (5), during DCM the output power (and the output voltage $V_O$) is responsive to the switching frequency $f_S$ (or switching period $T_S$) and any subsequent modulations to the switching frequency $f_S$ and switching period $T_S$. The peak current $I_{PEAK}$ is also responsive to the switching period (or switching period $T_S$) and any subsequent modulations to the switching frequency $f_S$ and switching period $T_S$. As will be illustrated further and in accordance with embodiments of the present invention, the switched mode power supply 100 may compensate for variations in the output power $P_{OUT}$ and output voltage $V_O$ caused by the jitter fraction $\delta(t)$.

Compensation for the jitter may be provided by the jitter compensated controller 130 (as will be further discussed below). In addition to various modes of operation, such as CCM and DCM, the switched mode power supply 100 may also utilize various modes of control. In one example, the jitter compensated controller 130 may utilize pulse width modulation (PWM) duty ratio programmed control. In another example, the jitter compensated controller 130 may utilize pulse width modulation (PWM) current programmed control.

Referring next to FIG. 2B, another diagram of an example of a switching current waveform is illustrated including switch current $I_D$ 214, switching period $T_S$ 216, switch on-time $t_{ON}$ 218, and switch off-time $t_{OFF}$ 220. In one example, the current waveform of FIG. 2B demonstrates the general switch current $I_D$ 136 of FIG. 1 with respect to time when pulse width modulation (PWM) control of the switch S1 110 is utilized by the jitter compensated controller 130 operating in DCM to regulate the output quantity $U_O$. In particular, FIG. 2B demonstrates the general switch current $I_D$ 136 with respect to time when PWM duty ratio programmed control is utilized.

PWM control of the switch S1 110 may be utilized with both CCM and DCM modes of operation of the power supply. As illustrated in FIG. 2B, the switch S1 110 conducts at the beginning of each switching period $T_S$ 216. In one example of PWM control, regulation may be accomplished by modulation of the duty cycle, also known as the duty ratio, of the switch S1 110. In general, the duty ratio is the ratio of the switch on-time $t_{ON}$ 218 to the switching period $T_S$ 216. In one example, modulation of the duty ratio may be accomplished by changing the switch on-time $t_{ON}$ 218 while the switching period $T_S$ 216 remains fixed. This mode of control is known as fixed frequency voltage mode control, fixed frequency voltage mode PWM or fixed frequency PWM duty ratio programmed control.

However, the term "fixed frequency control" does not necessarily entail that the switching frequency $f_S$ of the switch S1 110 remains unchanged. Thus, the use of the term "fixed frequency" control as used herein indicates that the switching frequency $f_S$ of the switch is not used as a control variable to regulate the output quantity $U_O$. For the example of fixed frequency duty ratio programmed control, the switch on-time or the duty ratio is utilized as the control variable to regulate the output quantity $U_O$. For the various embodiments of the present invention, frequency modulation for EMI emissions with jitter compensation may still be utilized alongside fixed frequency control modes since the switching frequency $f_S$ is not utilized as a control variable to regulate the output quantity $U_O$.

It should also be appreciated that compensation and control are different concepts. Control of a variable to provide a quantity at a desired value is performed as a closed loop function requiring feedback regarding the quantity. For control, the quantity is sensed and compared to the desired value for that quantity. When there is an error between the sensed quantity and the desired value, the variable is controlled to reduce the error between the sensed quantity and the desired value for that quantity. On the other hand, compensation of a variable to produce a desired value for a quantity is performed as an open loop function that does not require feedback regarding the quantity. For compensation, known relationships between the variable and the quantity are utilized to provide the desired value for the quantity. The variable is adjusted to balance the effects of the known relationships and to provide the quantity at the desired value. However control and compensation may be utilized together. For example, a power supply may include a controller to regulate an output voltage of the power supply. The controller may receive feedback information representative of the output voltage and then controls the duty ratio of a switch to provide the desired output voltage based on the feedback. According to embodiments of the present invention, the controller may include jitter compensation that adjusts the duty ratio independent of the feedback signal based on a known relationship between the amount that the switching frequency is modulated and its known effect on the output voltage. In this example, the duty ratio of the switch is controlled in response to a feedback signal and is compensated for the modulated switching frequency independent of the feedback signal.

Referring next to FIG. 2C, another diagram of an example of a switching current waveform is illustrated including switch current $I_D$ 222, switching period $T_S$ 224, switch on-time $t_{ON}$ 226, switch off-time $t_{OFF}$ 228, and a maximum current threshold $I_{MAX}$ 230. In one example, FIG. 2C demonstrates the general switch current $I_D$ 136 of FIG. 1 with respect to time when PWM control of the switch S1 110 is utilized by the jitter compensated controller 130 to regulate the output quantity $U_O$. In particular, FIG. 2B demonstrates the general switch current $I_D$ 136 with respect to time when PWM current programmed control is utilized.

The switch S1 110 conducts at the beginning of each switching period $T_S$ 224. Switch S1 110 conducts until the switch current $I_D$ 222 reaches the maximum current threshold $I_{MAX}$ 230. In one example, control of the maximum current threshold $I_{MAX}$ 230 at a constant switching period $T_S$ 202 (otherwise known as fixed switching frequency $f_S$) maintains the peak of the switch current $I_D$ 222 at a value required to regulate the output quantity $U_O$. In general, a higher maximum current threshold $I_{MAX}$ 230 results in a longer switch on-time $t_{ON}$ 226. In some embodiments of the present invention, the maximum current threshold $I_{MAX}$ 230 is also the peak primary current $I_{PEAK}$. The regulation is accomplished by a fixed frequency PWM technique known as fixed frequency PWM current mode control, fixed frequency PWM current programmed control, and/or peak current mode control.

As mentioned above, the term "fixed frequency control" does not necessarily entail that the switching frequency $f_S$ of the switch S1 110 remains unchanged and the use of the term "fixed frequency" control indicates that the switching frequency $f_S$ of the switch is not used as a control variable to regulate the output quantity $U_O$. For the example of fixed frequency current mode control, the value of the maximum current threshold $I_{MAX}$ 230 is utilized as the control variable to regulate the output quantity $U_O$. For the various embodiments of the present invention, frequency modulation for EMI emissions with jitter compensation may still be utilized alongside fixed frequency control modes since the switching frequency $f_S$ is not utilized as a control variable to regulate the output quantity $U_O$.

Utilizing the various modes of control, including the modes of control mentioned above, the jitter compensated controller 130 may compensate for the jitter fraction $\delta(t)$. For PWM duty ratio programmed control, as discussed with respect to FIG. 2B, the jitter compensated controller 130 may compensate the duty ratio of the power supply 100 to offset the effects of frequency jitter (or in other words frequency modulation) on the output power $P_{OUT}$ and output voltage $V_O$ of the power supply 100. By combining equation (5) and equation (7) from above, the output voltage $V_O$ may be given as:

$$V_O = V_{IN} D \frac{N_S}{N_P} \sqrt{\frac{RT_S(1+\delta(t))}{2L}} \quad (8)$$

In accordance with an embodiment of the present invention, the jitter compensated controller 130 may offset the effects of frequency jitter by substituting the duty ratio D with a compensated duty ratio $D_{COMP}$:

$$D_{COMP} = D \sqrt{\frac{1}{1+\delta(t)}} \quad (9)$$

However, square-root functions are difficult to implement. The exact compensated duty ratio $D_{COMP}$ of equation (9) may then be expressed as the first order approximation of a power series expansion:

$$D_{COMP} \approx D\left(1 - \frac{1}{2}\delta(t)\right) \quad (10)$$

By utilizing the approximate compensated duty ratio as illustrated by equation (10), the jitter compensated controller 130 may offset the effects of the jitter fraction δ(t). It should be appreciated that the amount multiplied against the duty ratio D may be referred to herein as the compensation factor. For equation (10), the compensation factor is:

$$1 - \frac{1}{2}\delta(t) \quad (11)$$

The compensation factor may generally be written as:

$$1+k\delta(t), \quad (12)$$

where k is the compensation coefficient. For equation (10) and (11), the compensation coefficient $$k = -\frac{1}{2}.$$

Equations (10) and (11) illustrate the value of the approximate compensated duty ratio $D_{COMP}$ and the compensation factor when first order approximation of a power series is utilized. However, it should be appreciated that other approximations may be used. The magnitude of the compensation coefficient may be a value:

$$0 < |k| \le \frac{1}{2}.$$

In another embodiment of the present invention, when PWM duty ratio programmed control is utilized the value of k=−0.45. As illustrated by the general form of the compensation factor in equation (12), the value of the compensation coefficient and the jitter fraction, kδ(t), is the percentage amount which the duty ratio D must change to arrive at an approximated compensated duty ratio $D_{COMP}$.

For example, if the value of kδ(t) is −0.09, that corresponds to a 9% change to the duty ratio D to arrive at a compensated duty ratio $D_{COMP}$. Or in other words, the approximate compensated duty ratio $D_{COMP}$ is 91% of the duty ratio D when kδ(t) is −0.09. If the value of kδ(t) is +0.09, that also corresponds to a 9% change to the duty ratio D to arrive at the approximate compensated duty ratio $D_{COMP}$. However, the approximate compensated duty ratio $D_{COMP}$ is 109% of the duty ratio D when kδ(t) is +0.09.

For another example, the magnitude of the jitter fraction δ(t), |δ(t)|, is 20% or 0.20 As such, the compensation factor utilizing the first order power series approximation from equation (11) is 0.9, corresponding to $$k = -\frac{1}{2}.$$

Or in other words, the approximate compensated duty ratio $D_{COMP}$ from equation (10) is 90% of the duty ratio D. However when the magnitude of the jitter fraction |δ(t)| is 20% (or 0.20), the compensation factor from equation (9) equals 0.91 and as a result the exact compensated duty ratio $D_{COMP}$ from equation (9) is 91% of the duty ratio D. Even for a reasonably large magnitude of the jitter fraction |δ(t)| of 20%, the error between the exact compensated duty ratio $D_{COMP}$ from equation (9) and the approximate compensated duty ratio $D_{COMP}$ from equation (10) is relatively small. However utilizing the knowledge that a 20% jitter fraction δ(t) produces an exact compensation factor of 0.91 from equation (9), the general compensation factor equation of equation (12) may be further tailored to approximate the compensated duty ratio $D_{COMP}$ with less error than the first order power series approximation shown in equation (11). For a 20% jitter fraction δ(t), the compensation coefficient k may be chosen to equal k=−0.45 such that the compensation factor would substantially equal 0.91. In one embodiment, the compensation coefficient may be a value:

$$0 < |k| \le \frac{1}{2}.$$

For PWM current programmed control, as discussed with respect to FIG. 2C, the jitter compensated controller may compensate the peak current $I_{PEAK}$ of the power supply 100 to offset the effects of frequency jitter (or in other words frequency modulation) on the output power $P_{OUT}$ and output voltage $V_O$ of the power supply 100. In one embodiment of the present invention, $I_{PEAK}$ is also the maximum current threshold $I_{MAX}$ 230. Equation (5) above illustrates that the output voltage $V_O$ is also a function of the peak current $I_{PEAK}$. In accordance with an embodiment of the present invention, the jitter compensated controller 130 may offset the effects of frequency jittering by substituting the peak current $I_{PEAK}$ with a compensated peak current $I_{COMP}$ given by:

$$I_{COMP} = I_{PEAK}\sqrt{1+\delta(t)} \quad (13)$$

However as mentioned above, square-root functions are difficult to implement. The compensated peak current $I_{COMP}$ may then be expressed as the first order approximation of a power series expansion:

$$I_{COMP} \approx I_{PEAK}\left(1 + \frac{1}{2}\delta(t)\right) \quad (14)$$

First order approximation of a power series expansion may be utilized since the jitter fraction δ(t) is a small value. However, it should be appreciated that other approximations may be used. It should be appreciated that the amount multiplied against the peak current $I_{PEAK}$ may be referred to herein as the compensation factor. For equation (14), the compensation factor is:

$$1 + \frac{1}{2}\delta(t) \quad (15)$$

In comparing the compensation factor of equation (15) with the formula for the general compensation factor shown in equation (12), the compensation coefficient $$k = \frac{1}{2}.$$

However, as mentioned above, the compensation coefficient k may be altered depending on how accurate an approximation of the compensation factor is needed.

Figure 3:
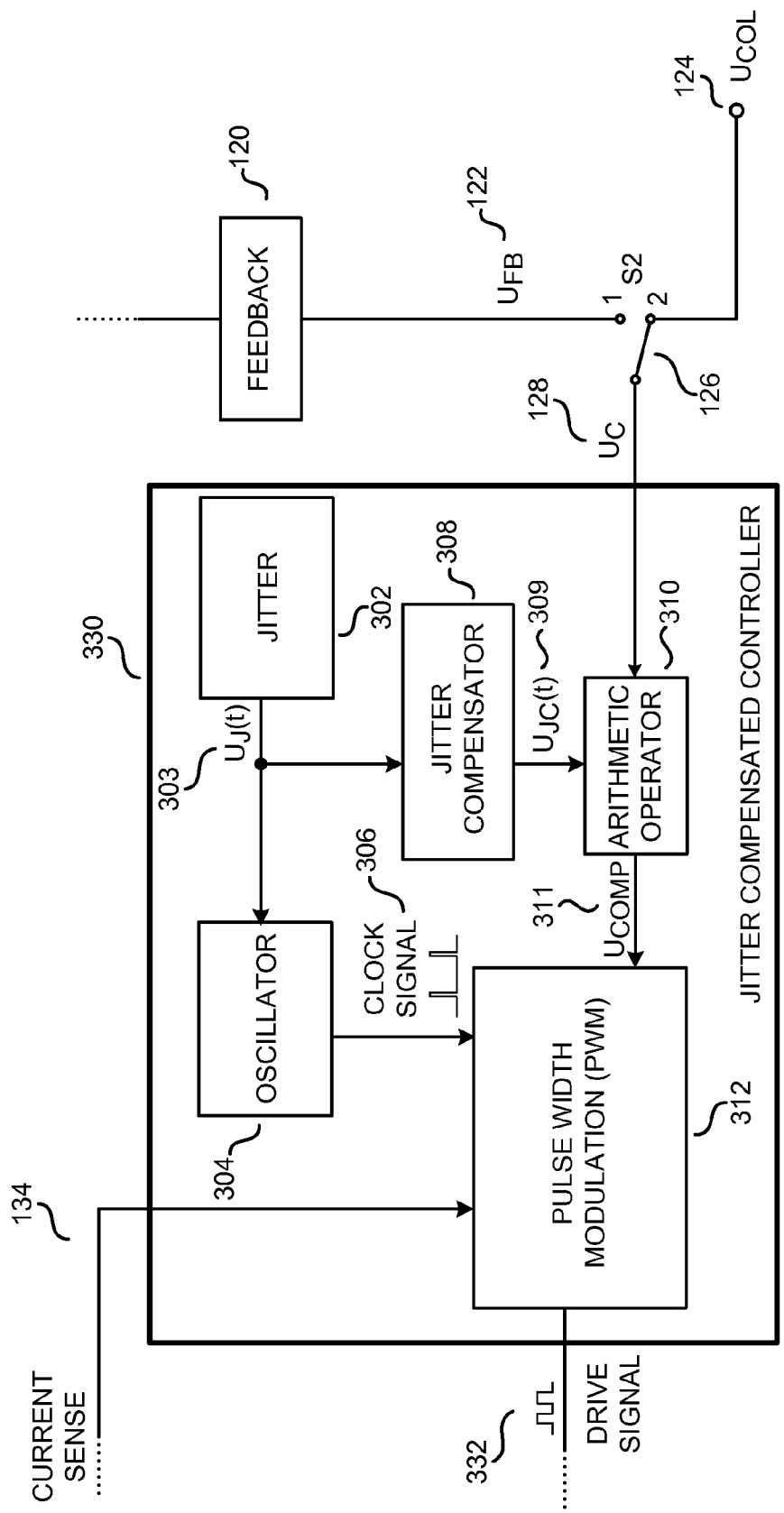
FIG. 3 is a functional block diagram illustrating a jitter compensated controller, in accordance with an embodiment of the present invention.

Referring next to FIG. 3, a functional block diagram of the jitter compensated controller 330 is illustrated. Jitter compensated controller 330 is one possible implementation of the jitter compensated controller 130 of FIG. 1. Jitter compensated controller 330 is illustrated as including a jitter block 302, a jitter signal $U_J(t)$ 303, an oscillator 304, a clock signal 306, a jitter compensator 308, jitter compensator signal $U_{JC}(t)$ 309, an arithmetic operator 310, a compensated controller input signal $U_{COMP}$ 311, and a pulse width modulator (PWM) 312. Also illustrated in FIG. 3 are feedback circuit 120, feedback signal $U_{FB}$ 122, switch S2 126, constant open loop signal $U_{COL}$ 124, controller input $U_C$ 128, drive signal 332 and current sense input 134. It should be appreciated that drive signal 332 is one example of the drive signal 132 of FIG. 1.

The feedback circuit 120, feedback signal $U_{FB}$ 122, switch S2 126, constant open loop signal $U_{COL}$ 124, controller input $U_C$ 128 and current sense input 134 couple and function as described with respect to FIG. 1. The jitter block 302 couples to the oscillator 304 and the jitter compensator 308 and outputs jitter signal $U_J(t)$ 303. The oscillator also couples to the PWM 312 and outputs the clock signal 306 to the PWM 312. The jitter compensator 308 also couples to the arithmetic operator 310 and outputs the jitter compensator signal $U_{JC}(t)$ 309. In addition to the jitter compensator signal $U_{JC}(t)$ 309, the arithmetic operator 310 receives the controller input $U_C$ 128. The arithmetic operator also couples to the PWM 312 and the resultant compensated controller input signal $U_{COMP}$ 311 is received by the PWM 312. Optionally, the PWM 312 may be coupled to receive the current sense input 134. Utilizing the various signals, the PWM 312 outputs the drive signal 332 which operates the switch S1 110 and regulates various switching parameters to substantially regulate the output quantity $U_O$ to the desired value.

The drive signal 332 controls the turning on and turning off of the switch S1 110. In one example, the drive signal 332 may be a rectangular pulse waveform with varying lengths of logic high and logic low sections, with a logic high value corresponding to a closed switch and a logic low corresponding to an open switch. When the switch S1 110 is a MOSFET, the drive signal 332 may be analogous to the gate signal of a transistor with a logic high value corresponding to a closed switch and a logic low corresponding to an open switch.

Various components, such as the jitter block 302, oscillator 304, jitter compensator 308 and PWM 312 affect the resultant drive signal 332. Jitter block 302 provides the amount of modulation of the switching frequency $f_S$ or switching period $T_S$. In one embodiment of the present invention, jitter block 302 provides the amount of frequency modulation to reduce EMI emissions of the power supply 100. The jitter block 302 provides jitter signal $U_J(t)$ 303, which represents the jitter fraction δ(t) of the equations above. Since the jitter fraction δ(t) changes with time, the jitter signal $U_J(t)$ 303 also changes with time and is referenced accordingly. As mentioned, the jitter fraction δ(t) may be a percentage amount of change to the switching period $T_S$ and the magnitude of the jitter fraction δ(t) can be a value between zero and one. The jitter signal $U_J(t)$ 303 is then sent to the oscillator 304.

In some embodiments of the present invention, the oscillator 304 outputs the clock signal 306 which provides the switching period $T_S$ to the PWM 312. Utilizing the jitter fraction δ(t) from the jitter signal $U_J(t)$ 303, the oscillator 304 modulates the switching period $T_S$ by the jitter fraction δ(t). The resultant modulated switching period $T_S$ is sent to PWM 312 through clock signal 306. In embodiments of the present invention, the clock signal 306 is a rectangular pulse waveform. In one example, the rising edge of the clock signal 306 indicates the beginning of a switching period $T_S$.

The jitter signal $U_J(t)$ 303 is also sent to the jitter compensator 308. As discussed with regards to the above equations, specifically equation (11), equation (12) and equation (15), in one embodiment the jitter compensator 308 determines the compensation factor for the duty ratio D or the peak current $I_{PEAK}$ from the jitter signal $U_J(t)$ 303. In one example, the jitter signal $U_J(t)$ 303 provides information regarding the jitter fraction δ(t) and the jitter compensator 308 determines the compensation factor for the duty ratio D or the peak current $I_{PEAK}$ from the jitter signal $U_J(t)$ 303. The jitter compensator 308 then sends information regarding the compensation factor of equation (12) to the arithmetic operator 310 through jitter compensator signal $U_{JC}(t)$ 309. Depending upon the mode of control, in some embodiments of the present invention the jitter compensator signal $U_{JC}(t)$ 309 represents the compensation factor of equation (11) or equation (15). However, as mentioned above the compensation coefficient k of equation (11) or equation (15) may be altered depending upon how much accuracy is needed in approximating the compensation factor. In one embodiment, the compensation coefficient k may be chosen to minimize the error in approximation. It should also be appreciated that the jitter compensator signal $U_{JC}(t)$ 309 may also represent the amount, kδ(t). In various examples, the jitter compensator signal $U_{JC}(t)$ 309 may represent the percentage amount of change to either the duty ratio D or the peak current $I_{PEAK}$. In general, the jitter compensated signal $U_{JC}(t)$ 309 represents some manipulation of the jitter fraction δ(t). Since the jitter fraction δ(t) changes with time t, the jitter compensated signal $U_{JC}(t)$ 309 also changes with time t and is referenced accordingly. Signals such as the jitter signal $U_J(t)$ 303 and jitter compensated signal $U_{JC}(t)$ 309 may be represented as a voltage signal or a current signal.

Arithmetic operator 310 couples to the jitter compensator 308, switch S2 126 and the pulse width modulator (PWM) 312. In operation, the arithmetic operator 310 receives the jitter compensator signal $U_{JC}(t)$ 309 and the controller input $U_C$ 128. Functionally, the arithmetic operator 310 may perform a number of arithmetic operations such as addition, subtraction, multiplication and division to the various inputs to the arithmetic operator 310 to provide a resultant output.

In open loop configuration, the controller input $U_C$ 128 is a constant open loop signal $U_{COL}$ 124. In some embodiments, the constant open loop signal $U_{COL}$ 124 provides information regarding the value of the duty ratio D or the peak current $I_{PEAK}$ of the power supply 100. In closed loop configuration, the controller input $U_C$ 128 is the feedback signal $U_{FB}$ 122. The feedback signal $U_{FB}$ 122 facilitates the regulation of the output quantity $U_O$. In some embodiments, the feedback signal $U_{FB}$ 122 provides information regarding the value of the output quantity $U_O$ which is used to determine the duty ratio D or the peak current $I_{PEAK}$ utilized to regulate the output quantity $U_O$. The constant open loop signal $U_{COL}$ 124 and feedback signal $U_{FB}$ 122 may be represented as a voltage signal or a current signal.

The arithmetic operator 310 utilizes the received jitter compensator signal $U_{JC}(t)$ 309 and the controller input $U_C$ 128 to produce an output which is sent to the PWM 312. The output of the arithmetic operator 310 is referred to as the compensated controller input $U_{COMP}$ 311. The compensated controller input $U_{COMP}$ 311 may be represented as a voltage signal or a current signal. In some embodiments, the compensated controller input $U_{COMP}$ 311 is the compensated duty ratio $D_{COMP}$ or the compensated peak current $I_{COMP}$ as illustrated with regards to equation (10) and equation (14). The PWM 312 then utilizes the compensated controller input $U_{COMP}$ 311 outputted from the arithmetic operator 310 to produce the drive signal 332.

In one example, the jitter compensator 308 sends the arithmetic operator 310 information regarding the compensation factor of equation (12). Depending upon the mode of control, the jitter compensator signal $U_{JC}(t)$ 309 represents the compensation factor of equation (11) or equation (15). When the jitter compensator signal $U_{JC}(t)$ 309 represents the compensation factor of equation (12), the arithmetic operator 310 performs multiplication to multiply the compensation factor of equation (12) with the controller input $U_C$ 128. Depending on the mode of control, the arithmetic operator 310 performs multiplication to provide the compensated controller input $U_{COMP}$ 311 representative of either the compensated duty ratio $D_{COMP}$ or the compensated peak current $I_{COMP}$ of equations (10) and (14).

In one embodiment, the jitter compensated controller 330 utilizes PWM duty ratio programmed control and the controller input $U_C$ 128 represents the value of the duty ratio D to regulate the output quantity $U_O$ while the jitter compensator signal $U_{JC}(t)$ 309 represents the compensation factor of equation (11). However, it should be appreciated that the compensation coefficient k of equation (11) may be chosen depending on how accurate an approximation for the compensated duty ratio $D_{COMP}$ is needed. The arithmetic operator 310 then performs multiplication to output the compensated duty ratio $D_{COMP}$ of equation (10). The compensated controller input $U_{COMP}$ 311 outputted by the arithmetic operator 310 and received by the PWM 312 represents the compensated duty ratio $D_{COMP}$ of equation (10).

In another embodiment, the jitter compensated controller 130 utilizes PWM current programmed control and the controller input $U_C$ 128 represents the value of the peak current $I_{PEAK}$ to regulate the output quantity $U_O$ while the jitter compensator signal $U_{JC}(t)$ 309 represents the compensation factor of equation (15). However, it should be appreciated that the compensation coefficient k of equation (15) may be chosen depending on how accurate an approximation for the compensated peak current $I_{COMP}$ is needed. The arithmetic operator 310 then performs multiplication to output the compensated peak current $I_{COMP}$ of equation (14). The compensated controller input $U_{COMP}$ 311 outputted by the arithmetic operator 310 and received by the PWM 312 would represent the compensated peak current $I_{COMP}$ of equation (14).

It should also be appreciated that the jitter compensator signal $U_{JC}(t)$ 309 may also represent the product of compensation coefficient and the jitter fraction, $k\delta(t)$. For this embodiment, the arithmetic operator 310 may perform multiplication along with addition or subtraction depending on the value of the product of the compensation coefficient and the jitter fraction, $k\delta(t)$. The arithmetic operator 310 may add a value substantially equal to one to the jitter compensator signal $U_{JC}(t)$ 309 representative of the product of compensation coefficient and the jitter fraction, $k\delta(t)$, to calculate the compensation factor of equation (12). The arithmetic operator 310 then multiplies the resultant compensation factor to the controller input $U_C$ 128. As mentioned above, the controller input $U_C$ 128 provides information which is used to determine the duty ratio D or the peak current $I_{PEAK}$ of the power supply 100. Depending on the mode of operation, the arithmetic operator 310 outputs the compensated controller input $U_{COMP}$ 311 representative of the compensated duty ratio $D_{COMP}$ or the compensated peak current $I_{COMP}$.

As mentioned above, the arithmetic operator 310 may perform multiplication along with addition or subtraction when the jitter compensator signal $U_{JC}(t)$ 309 represents the product of compensation coefficient and the jitter fraction, $k\delta(t)$. In another embodiment, the arithmetic operator 310 may multiply the jitter compensator signal $U_{JC}(t)$ 309 with the controller input $U_C$ 128. The resultant product is then added to the controller input $U_C$ 128 by the arithmetic operator 310. As mentioned above, the controller input $U_C$ 128 provides information which is used to determine the duty ratio D or the peak current $I_{PEAK}$ of the power supply 100. Depending on the mode of operation, the arithmetic operator 310 outputs the compensated controller input $U_{COMP}$ 311 representative of the compensated duty ratio $D_{COMP}$ or the compensated peak current $I_{COMP}$.

Figure 4:
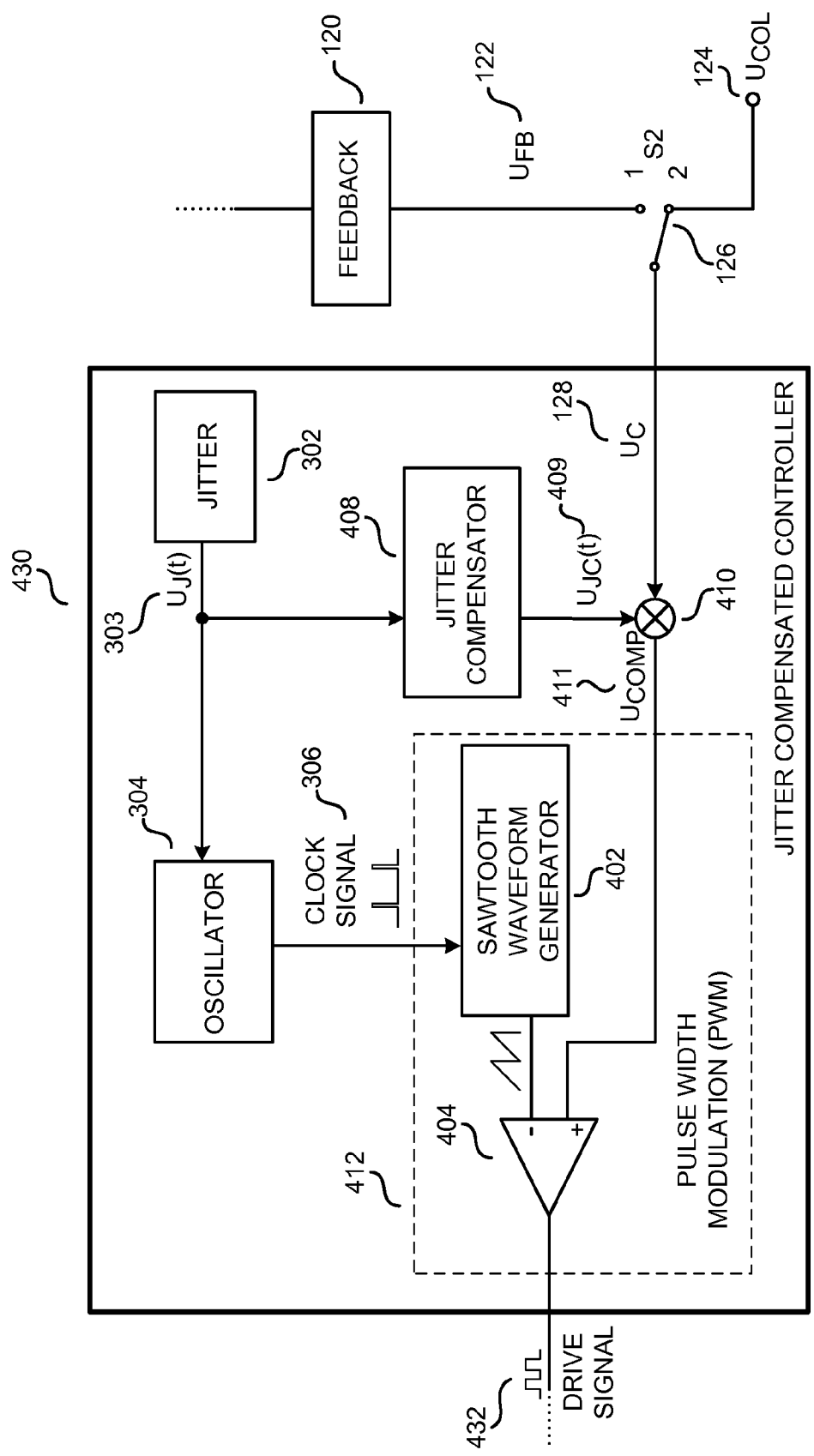
FIG. 4 is a functional block diagram of a jitter compensated controller utilizing PWM duty ratio programmed control, in accordance with an embodiment of the present invention.

Referring next to FIG. 4, a functional block diagram of the jitter compensated controller 430 is illustrated. Jitter compensated controller 430 is one possible implementation of the jitter compensated controller 130 of FIG. 1 or jitter compensated controller 330 of FIG. 3 utilizing PWM duty ratio programmed control. Jitter compensated controller 430 is illustrated as including jitter block 302, jitter signal $U_J(t)$ 303, oscillator 304, clock signal 306, a jitter compensator 408, a jitter compensator signal $U_{JC}(t)$ 409, a multiplier 410, a compensated controller input $U_{COMP}$ 411 and a pulse width modulator (PWM) 412. The PWM 412 further includes a sawtooth waveform generator 402 and comparator 404. Also illustrated in FIG. 4 is feedback circuit 120, feedback signal $U_{FB}$ 122, switch S2 126, constant open loop signal $U_{COL}$ 124, controller input $U_C$ 128, and drive signal 432. It should be appreciated that drive signal 432 is one example of the drive signal 132 of FIG. 1 or drive signal 332 of FIG. 3.

The feedback circuit 120, feedback signal $U_{FB}$ 122, switch S2 126, constant open loop signal $U_{COL}$ 124, controller input $U_C$ 128, jitter block 302, jitter signal $U_J(t)$ 303, oscillator 304, and clock signal 306 couple and function as described with respect to FIGS. 1 and 3. The jitter compensator 408 couples to the jitter block 302 and receives the jitter signal $U_J(t)$ 303 and outputs the jitter compensator signal $U_{JC}(t)$ 409. The sawtooth waveform generator 402 is coupled to the oscillator 304 and receives the clock signal 306. The sawtooth waveform generator 402 further couples to comparator 404. In the illustrated example, the output of the sawtooth waveform generator 402 is received at the inverting input of the comparator 404. As shown in FIG. 4, the non-inverting input of comparator 404 is coupled to the multiplier 410 and receives the output of the multiplier 410. The comparator 404 outputs the drive signal 432. For the example shown in FIG. 4, the multiplier 410 is one example of the arithmetic operator 310 when the jitter compensated signal $U_{JC}(t)$ 409 represents the compensation factor.

The sawtooth waveform generator 402 receives the clock signal 306 which provides the sawtooth waveform generator 402 with the switching period $T_S$ and subsequent jitter fraction $\delta(t)$, in other words the modulated switching period $T_S$. A sawtooth waveform is output with the same period as the switching period $T_S$ and subsequent jitter fraction $\delta(t)$ provided by the oscillator 304. In some embodiments, the sawtooth waveform generator 402 determines the maximum switching period $T_S$ of the power supply 100. In the example of FIG. 4, the jitter compensated controller 430 utilizes PWM duty ratio programmed control and the jitter compensator 408 is one example of jitter compensator 308 of FIG. 3 where the jitter compensator 408 outputs a jitter compensated signal $U_{JC}(t)$ 409 representative of the compensation factor. For example, equation (11) illustrates one example of the compensation factor with a compensation coefficient of $$k = -\frac{1}{2}.$$

In one example, the jitter compensated signal $U_{JC}(t)$ 409 is a voltage signal. The controller input $U_C$ 128 provides information which is used to determine the value of the duty ratio D of the power supply 100 when the jitter compensated controller 430 utilizes PWM duty ratio programmed control. As mentioned above, the controller input $U_C$ 128 may be either the feedback signal $U_{FB}$ 122 or the constant open loop signal $U_{COL}$ 124 depending whether the power supply 100 is operating in a closed loop configuration or an open loop configuration. For the example embodiment shown in FIG. 4, the constant open loop signal $U_{COL}$ 124 provides information regarding the value of the duty ratio D of the power supply 100 operating in open loop configuration. However, most power supplies operate in a closed loop configuration. In closed loop configuration, the feedback signal $U_{FB}$ 122 provides information regarding the value of the output quantity $U_O$ which is used to determine the duty ratio D to regulate the output quantity $U_O$.

The multiplier 410 receives the jitter compensator signal $U_{JC}(t)$ 409 and the controller input $U_C$ 128. As mentioned above, the multiplier 410 is one example of the arithmetic operator 310 of FIG. 3. The multiplier 410 multiplies the jitter compensator signal $U_{JC}(t)$ 409 and the controller input $U_C$ 128 to produce the compensated controller input $U_{COMP}$ 411 which is sent to the non-inverting input of comparator 404. In one embodiment, the jitter compensator signal $U_{JC}(t)$ 409 provides the compensation factor of equation (11). The compensated controller input $U_{COMP}$ 411 output from the multiplier 410 sets the duty ratio for the power supply 100. In the example illustrated in FIG. 5, the compensated controller input $U_{COMP}$ 411 represents the compensated duty ratio $D_{COMP}$. Equation (10) illustrates one example of the compensated duty ratio $D_{COMP}$ in accordance with embodiments of the present invention. The comparator 404 receives the compensated controller input $U_{COMP}$ 411 and outputs the drive signal 432. When the voltage at the non-inverting input of the comparator 404 is greater than the voltage on the inverting input of the comparator 404, the comparator 404 outputs a logic high value. When the voltage on the inverting input of the comparator 404 is greater than the voltage on the non-inverting input of the comparator 404, the comparator 404 outputs a logic low value. In this sense, the output of multiplier 410 may set the duty ratio D of the power supply 100.

Figure 5:
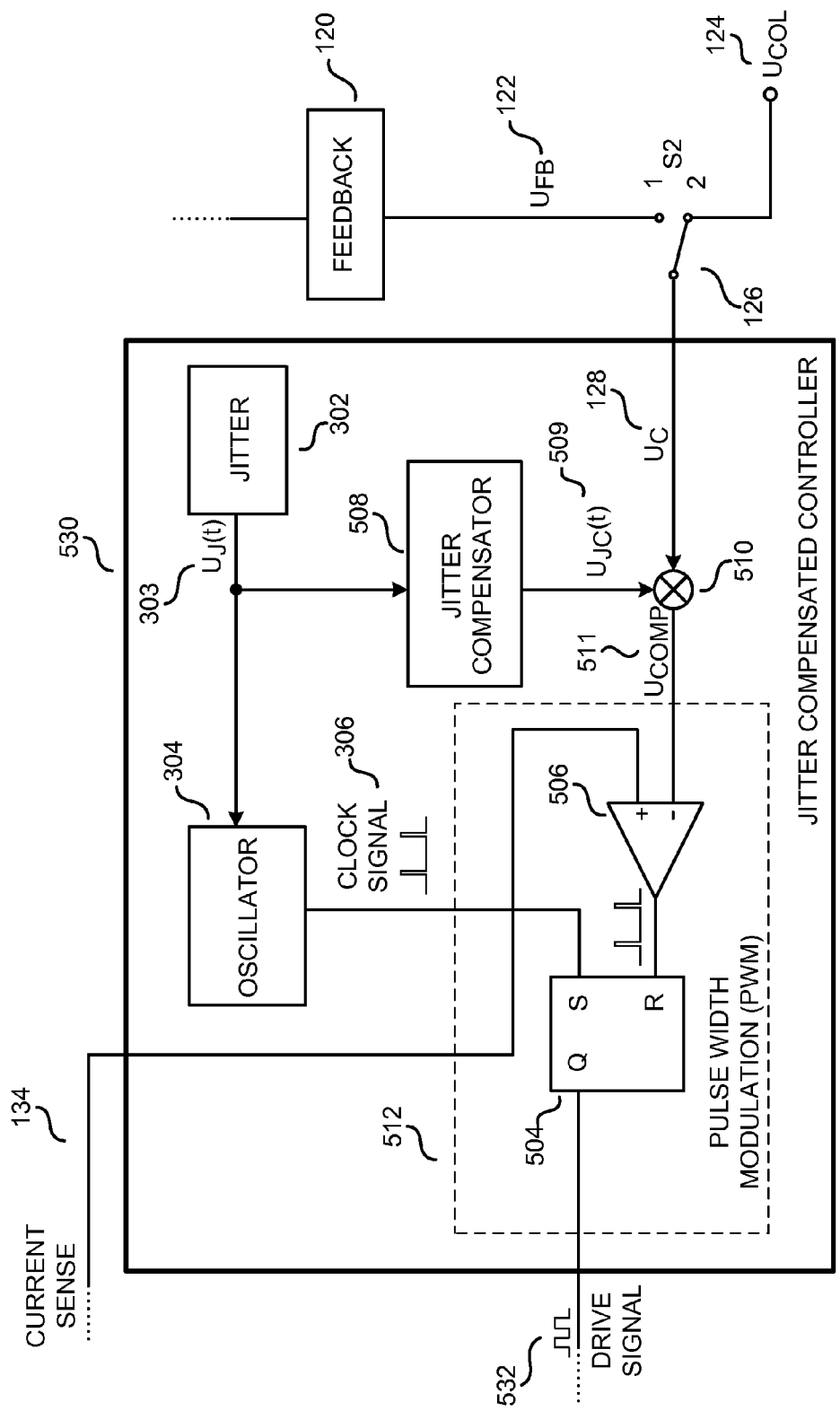
FIG. 5 is a functional block diagram of a jitter compensated controller utilizing PWM current programmed control, in accordance with an embodiment of the present invention.

Referring next to FIG. 5, a functional block diagram of the jitter compensated controller 530 is illustrated. Jitter compensated controller 530 is one possible implementation of jitter compensated controller 130 of FIG. 1 or jitter compensated controller 330 of FIG. 3 utilizing PWM current programmed control. Jitter compensated controller 530 is illustrated as including jitter block 302, jitter signal $U_J(t)$ 303, oscillator 304, clock signal 306, a jitter compensator 508, jitter compensator signal $U_{JC}(t)$ 509, a multiplier 510, a compensated controller input $U_{COMP}$ 511 and a pulse width modulator (PWM) 512. PWM 512 further includes a comparator 506 and a latch 504. Also illustrated in FIG. 5 are feedback circuit 120, feedback signal $U_{FB}$ 122, switch S2 126, constant open loop signal $U_{COL}$ 124, controller input $U_C$ 128, drive signal 532 and current sense input 134. It should be appreciated that drive signal 532 is one example of the drive signal 132 of FIG. 1 or drive signal 332 of FIG. 3.

The feedback circuit 120, feedback signal $U_{FB}$ 122, switch S2 126, constant open loop signal $U_{COL}$ 124, controller input $U_C$ 128, current sense input 134, jitter block 302, oscillator 304 and clock signal 306 couple and function as described with respect to FIGS. 1 and 3. The jitter compensator 508 couples to jitter block 302 and receives the jitter signal $U_J(t)$ 303 and outputs the jitter compensator signal $U_{JC}(t)$ 509. The comparator 506 couples to the current sense input 134 and the output of the multiplier 510. For the example shown in FIG. 5, the multiplier 510 is one example of the arithmetic operator 310 when the jitter compensated signal $U_{JC}(t)$ 509 represents the compensation factor. The compensated controller input $U_{COMP}$ 511 output from the multiplier 510 is received at the inverting input of the comparator 506 while the current sense signal 134 is received at the non-inverting input of comparator 506. The output of the comparator 506 couples to latch 504. Latch 504 further couples to oscillator 304 and receives the clock signal 306. In one example, latch 504 is an S-R latch and the clock signal is received at the S-input of latch 504 while the output of comparator 506 is received at the R-input of latch 504. The output of the latch 504 provides the drive signal 532.

In the example of FIG. 5, the jitter compensated controller 530 utilizes PWM current programmed control and the jitter compensator 508 is one example of jitter compensator 308 of FIG. 3 where the jitter compensator 508 outputs a jitter compensated signal $U_{JC}(t)$ 509 representative of the compensation factor. For example, equation (15) illustrates one example of the compensation factor. In addition to the jitter compensated signal $U_{JC}(t)$ 509, the multiplier 510 also receives the controller input $U_C$ 128. The controller input $U_C$ 128 provides information which is used to determine the value of the peak current $I_{PEAK}$ when the jitter compensated controller 530 utilizes PWM current programmed control. As mentioned above, the controller input $U_C$ 128 may either be the feedback signal $U_{FB}$ 122 or the constant open loop signal $U_{COL}$ 124 depending on whether the power supply 100 is operating in a closed loop configuration or an open loop configuration. For the example embodiment shown in FIG. 5, the constant open loop signal $U_{COL}$ 124 provides information regarding the value of the peak current $I_{PEAK}$ when the power supply 100 is operating in open loop configuration. However, most power supplies operate in a closed loop configuration. In closed loop configuration, the feedback signal $U_{FB}$ 122 provides information regarding the value of the output quantity $U_O$ which is used to determine the peak current $I_{PEAK}$ to regulate the output quantity $U_O$.

The multiplier 510 receives the jitter compensator signal $U_{JC}(t)$ 509 and the controller input $U_C$ 128. The multiplier 510 multiplies the jitter compensator signal $U_{JC}(t)$ 509 and the controller input $U_C$ 128 to produce the compensated controller input signal $U_{COMP}$ 511 which is sent to the inverting input of comparator 506. The output of the multiplier 510 sets the peak current $I_{PEAK}$ for the jitter compensated controller 530. In the example illustrated in FIG. 5, the compensated controller input signal $U_{COMP}$ 511 represents the compensated peak current $I_{COMP}$. Equation (14) illustrates one example of the compensated peak current $I_{COMP}$ in accordance with embodiments of the present invention. The comparator 506 compares the compensated controller input signal $U_{COMP}$ 511 with the value of the current sense input 134. When the value of the current sense input 134 is greater than the compensated controller input signal $U_{COMP}$ 511, the comparator 506 outputs a logic high value. When the compensated controller input signal $U_{COMP}$ 511 is greater than the value of the current sense input 134, the comparator 506 outputs a logic low value. The output of the comparator 506 is then sent to the R-input of latch 504.

The clock signal 306 is received at the S-input of latch 504. The clock signal 306 provides the switching period $T_S$ and subsequent jitter fraction $\delta(t)$ of the switched mode power supply 100. At the beginning of a switching period $T_S$, the value of the current sense input 134 is less than the compensated controller input signal $U_{COMP}$ 511. In other words, the switch current $I_D$ 136 sensed at the current sense input 134 is less than the compensated peak current $I_{COMP}$. As such, the output of comparator 506 is a logic low value. At the beginning of the switching period $T_S$, the clock signal 306 pulses to a logic high value while the output of the comparator is a logic low value resulting in a logic high output of the latch and the switch S1 110 closes. The clock signal 306 then quickly falls to a logic low value and results in the latch 504 holding the previous output value (for this example, a logic high value). Once the value of the current sense input 134 reaches the value of the compensated controller input signal $U_{COMP}$ 511, or in other words the switch current $I_D$ 136 sensed at the current sense input 134 reaches the compensated peak current $I_{COMP}$, the output of the comparator 506 pulses to a logic high value. As a result the output of the latch 504 switches to a logic low value and the switch S1 110 opens. The switch current $I_D$ 136 sensed by the current sense input 134 begins to fall due to the open switch S1 110 and the output of the comparator 506 becomes a logic low value resulting in the latch 504 holding the previous output value (for this example, a logic low value) until the clock signal 306 pulses to a logic high value at the beginning of the next switching period $T_S$. The output of the latch 504 provides the drive signal 532 for the switch S1 110 of the power supply 100.

Figure 6:
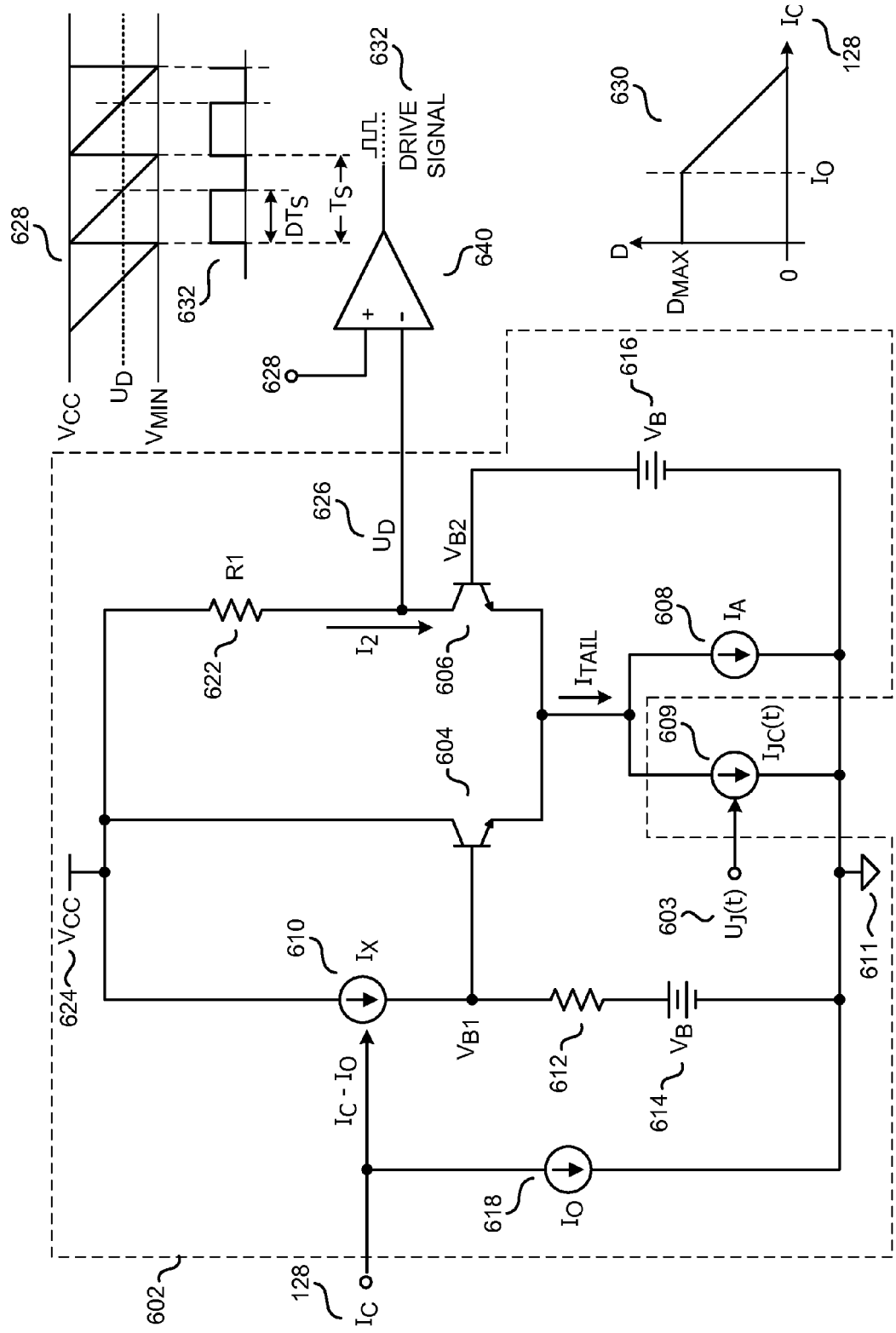
FIG. 6 is an example schematic of a jitter compensator and arithmetic operator, in accordance with one embodiment of the present invention.

Referring next to FIG. 6, an example schematic of the jitter compensator 609 and arithmetic operator 602 is illustrated including controller input $I_C$ 128, drive signal 632, jitter signal $U_J(t)$ 603, pulse width modulator (PWM) 640, a first transistor 604, a second transistor 606, a current source 608 with constant current $I_A$, a current source 610 with input current $I_X$, input return 611, resistor 612, a first voltage source $V_B$ 614, a second voltage source $V_B$ 616, current source 618 with offset current $I_O$, resistor 622, voltage $V_{CC}$ 624, and a duty ratio signal $U_D$ 626. Arithmetic operator 602 and jitter compensator 609 are possible implementations of the arithmetic operator 310 and jitter compensator 308, respectively, of FIG. 3. It should be appreciated that the duty ratio signal $U_D$ 626 is one example of the compensated controller input $U_{COMP}$ 311 of FIG. 3. In addition, the jitter signal $U_J(t)$ 603 is one example of the jitter signal $U_J(t)$ 303 of FIG. 3. For the example of FIG. 6, the controller input 128 is referenced as $I_C$ rather than $U_C$ (as seen in previous figures) to denote that the controller input $I_C$ 128 is a current signal. The jitter compensated current is referenced as $I_{JC}(t)$ to denote that the jitter compensated current $I_{JC}(t)$ is a function of time t.

Arithmetic operator 602 includes a differential amplifier comprising first transistor 604, second transistor 606, tail current $I_{TAIL}$, and current source 608 with constant current $I_A$. In addition, the differential amplifier further includes jitter compensator 609. As shown in FIG. 6, jitter compensator 609 may be implemented as a current source 609 which produces jitter compensated current $I_{JC}(t)$. The jitter compensated current $I_{JC}(t)$ may be one example of the jitter compensator signal $U_{JC}(t)$ 309 of FIG. 3. In the example of FIG. 6, the first transistor 604 and the second transistor 606 are NPN-type bipolar junction transistors. However, it should be appreciated that other transistor types may be used. Current source 608 of the differential amplifier is coupled to input return 611 such that a positive constant current $I_A$ flows to the input return 611. Current source 609 of the differential amplifier is coupled to input return 611 such that a positive jitter compensated current $I_{JC}(t)$ flows to the input return 611. The current sources 608 and 609 are coupled such that the tail current $I_{TAIL}$ of the differential amplifier is substantially equal to the sum of the constant current $I_A$ and the jitter compensated current $I_{JC}(t)$, mathematically: $I_{TAIL}=I_A+I_{JC}(t)$. In addition, the current source 609 couples to and receives the jitter signal $U_J(t)$ 603. In one embodiment, the value of the jitter compensated current $I_{JC}(t)$ provided by current source 609 may be determined by the jitter signal $U_J(t)$ 603. It should be appreciated that the current source 609 may be a voltage controlled current source or a current controlled current source when the jitter signal $U_J(t)$ 603 is either a voltage signal or a current signal, respectively.

One end of current source 610 with input current $I_X$ couples to the base of the first transistor 604 while the other end of current source 610 couples to the voltage $V_{CC}$ 624. Current source 610 also couples to and receives the controller input $I_C$ 128. In one embodiment, the value of the input current $I_X$ provided by the current source 610 may be determined by the controller input $I_C$ 128 and the offset current $I_O$ provided by current source 618. In one embodiment, the value of the input current $I_X$ is proportional to the value of the controller input $I_C$ 128. For the example of FIG. 6, when the controller input $I_C$ 128 is a current signal, the current source 610 may be a current controlled current source. However, it should be appreciated that when the controller input $U_C$ 128 is a voltage signal, the current source 610 may be a voltage controlled current source. Resistor 612 couples to the current source 610 and the base of the first transistor 604 at node $V_{B1}$. As illustrated, the voltage at node $V_{B1}$ is also the base voltage of the first transistor 604. The resistor 612 further couples to the positive end of the first voltage source $V_B$ 614 while the negative end of the first voltage source $V_B$ 614 couples to the input return 611. In the example of FIG. 6, the current source 618 with offset current $I_O$ is coupled to the controller input $I_C$ 128 and the current source 610 such that the current source 610 receives the difference between the controller input $I_C$ 128 and the offset current $I_O$. The current source 618 with offset current $I_O$ also couples to input return 611 such that a positive offset current $I_O$ flows to input return 611. In one embodiment of the present invention, the current source 618 with offset $I_O$ current is optional.

The positive end of the second voltage source $V_B$ 616 couples to the base of the second transistor 606. The negative end of the second voltage source $V_B$ 616 is coupled to input return 611. As illustrated in FIG. 6, the base voltage of the second transistor 606 is denoted as $V_{B2}$. In addition, the base voltage $V_{B2}$ of the second transistor 606 is substantially equal to the second voltage source $V_B$ 616. In some embodiments of the invention, the value of the first voltage source $V_B$ 614 and the second voltage source $V_B$ 616 are substantially equal. The second voltage source $V_B$ 616 sets the base voltage $V_{B2}$ of the second transistor 606.

Resistor 622 with resistance R1 and the PWM 640 are further coupled to the second transistor 606. The PWM 640 is one possible implementation of the PWM 312 shown in FIG. 3. The resistor 622 is coupled between the voltage $V_{CC}$ 624 and the collector of the second transistor 606. The duty ratio signal $U_D$ 626 is output from arithmetic operator 602 to PWM 640. It should be appreciated that the duty ratio signal $U_D$ 626 represents the duty ratio D or the compensated duty ratio $D_{COMP}$ (when jitter compensation is used) for the power supply. As explained above, the duty ratio signal $U_D$ 626 is one example of the compensated controller input $U_{COMP}$ 311 of FIG. 3. In the example of FIG. 6, the duty ratio signal $U_D$ 626 is the collector voltage of the second transistor 606. As discussed above with respect to FIG. 4, the PWM 412 may comprise of a comparator 404 and a sawtooth waveform generator 402. For the example shown in FIG. 6, the PWM 640 comprises a comparator which receives the sawtooth waveform 628 at the non-inverting input and the duty ratio signal $U_D$ 626 at the inverting input. The sawtooth waveform 628 of FIG. 6 has a maximum voltage substantially equal to the voltage $V_{CC}$ 624 with a minimum voltage set to $V_{MIN}$. In one embodiment of the present invention, the minimum voltage $V_{MIN}$ of the sawtooth waveform 628 may be substantially equal to zero. However, it should be appreciated that the minimum voltage $V_{MIN}$ may be set to a voltage which is less than $V_{CC}$ 624.

In the example of FIG. 6, the voltage $V_{CC}$ 624 minus the product of half the tail current $I_{TAIL}/2$ and the resistance R1 of resistor 622, mathematically:

$$V_{CC} - \frac{I_{TAIL}R_1}{2},$$

sets the maximum duty ratio $D_{MAX}$ (illustrated in the duty ratio to controller input relationship 630) of the power supply 100. In one example, the resistance R1 of resistor 622 and the constant current $I_A$ are chosen such that the product of half of the tail current $I_{TAIL}/2$ and the resistance R1 of resistor 622, mathematically: $(I_{TAIL}R1)/2$, is substantially equal to $V_{CC}-V_{MIN}$. When the product $(I_{TAIL}R1)/2$ is substantially equal to $V_{CC}-V_{MIN}$, the maximum duty ratio $D_{MAX}$ is substantially equal to one.

In another embodiment, the resistance R1 of resistor 622 and the constant current $I_A$ are chosen such that the maximum duty ratio $D_{MAX}$ is substantially equal to 0.78. In other words, the product of half of the tail current $I_{TAIL}/2$ and the resistance R1 of resistor 622, mathematically: $(I_{TAIL}R1)/2$, should be substantially equal to 78% of the difference between voltage $V_{CC}$ 624 and the minimum voltage $V_{MIN}$, mathematically:

$$\frac{I_{TAIL}R_1}{2} = 0.78(V_{CC} - V_{MIN}).$$

The PWM 640 couples between resistor 622 and second transistor 606. In the example of FIG. 6, the inverting input of the comparator which comprises PWM 640 couples to the second transistor 606. When the second transistor 606 is an NPN-type bipolar junction transistor, the inverting input of the comparator couples to the collector of the second transistor 606. The comparator then outputs the drive signal 632. It should be appreciated that drive signal 632 is one example of the drive signal 132 of FIG. 1 or drive signal 332 of FIG. 3.

The differential amplifier provides a current $I_2$ which is dependent upon the tail current $I_{TAIL}$ and base voltages $V_{B1}$ and $V_{B2}$ of the first transistor 604 and the second transistor 606, respectively. From the example of FIG. 6, current $I_2$ is the collector current of the second transistor 606. When the differential amplifier includes current source 609 with jitter compensated current $I_{JC}(t)$ due to jitter compensation by the controller 330, the tail current $I_{TAIL}$ is dependent on the constant current $I_A$ and the jitter compensated current $I_{JC}(t)$. In one embodiment current source 609 with jitter compensated current $I_{JC}(t)$ can be analogous to the jitter compensator 308. Current source 609 is controlled by jitter signal $U_J(t)$ 603 to produce jitter compensated current $I_{JC}(t)$. In the example of FIG. 6, the jitter compensator signal $U_{JC}(t)$ produced by current source 609 which comprises the jitter compensated current $I_{JC}(t)$ may represent the percentage amount of change to the duty ratio D, i.e. $k\delta(t)$, where k is the compensation coefficient and $\delta(t)$ is the jitter fraction as discussed above. For the example of FIG. 6, the jitter compensator signal $U_{JC}(t)$ is a current signal.

The current $I_2$ produced by the differential amplifier may be expressed as:

$$I_2 = \frac{I_{TAIL}}{1 + e^{(V_{B1}-V_{B2})/V_T}}, \quad (16)$$

where $V_T$ represents the thermal voltage of the first and second transistor 604 and 606. When there is no jitter compensated current $I_{JC}(t)$ produced by current source 609, the tail current $I_{TAIL}$ is substantially equal to the constant current $I_A$ produced by current source 608. For the example of FIG. 6, the second base voltage $V_{B2}$ is set to a constant value and is substantially equal to the second voltage source $V_B$ 616. As will be discussed further, the first base voltage $V_{B1}$ of first transistor 604 is partially determined by the controller input $I_C$ 128.

The second base voltage $V_{B2}$ of second transistor 606 is substantially equal to the second voltage source $V_B$ 616 and in one embodiment of the present invention the first voltage source $V_B$ 614 and the second voltage source $V_B$ 616 are substantially equal to each other. When the input current $I_X$ is substantially equal to zero and the first voltage source $V_B$ 614 and the second voltage source $V_B$ 616 are substantially equal to each other, the first base voltage $V_{B1}$ is substantially equal to the second base voltage $V_{B2}$. As such the current $I_2$ produced by the differential amplifier from equation (16) is substantially equal to half the tail current $I_{TAIL}/2$. When there is no jitter compensated current $I_{JC}(t)$ produced by current source 609, the current $I_2$ is substantially equal to $I_A/2$.

In the example of FIG. 6, the duty ratio signal $U_D$ 626 is the collector voltage of second transistor 606. When the first base voltage $V_{B1}$ and the second base voltage $V_{B2}$ are substantially equal, the current through resistor 622 is substantially equal to half the tail current $I_{TAIL}/2$ and the collector voltage of the second transistor 606 is substantially equal to $$V_{CC} - \frac{I_{TAIL}R_1}{2}.$$

The duty ratio signal $U_D$ 626 then outputs the collector voltage of the second transistor 606 to the inverting input of the comparator of PWM 640. The resultant output of the comparator of PWM 640, with the sawtooth waveform 628 bounded between the voltage $V_{CC}$ 624 and $V_{MIN}$, would be a drive signal 632 with a duty ratio substantially equal to $D_{MAX}$ when the first base voltage $V_{B1}$ and the second base voltage $V_{B2}$ are substantially equal.

When the input current $I_X$ produced by current source 610 due to the controller input $I_C$ 128 generates a voltage across resistor 612 such that the first base voltage $V_{B1}$ increases to a value greater than the second base voltage $V_{B2}$, the resultant current $I_2$ produced by the differential amplifier (as shown by equation (16)) is less than the current $I_2$ when the first base voltage $V_{B1}$ is substantially equal to the second base voltage $V_{B2}$. In other words, the resultant current $I_2$ produced by the differential amplifier is less than half the tail current $I_{TAIL}/2$ when the first base voltage $V_{B1}$ is greater than the second base voltage $V_{B2}$. As such the value of the duty ratio signal $U_D$ 626, or in other words the collector voltage of second transistor 606, when the first base voltage $V_{B1}$ is greater than the second base voltage $V_{B2}$ would be greater than the value of the duty ratio signal $U_D$ 626 when the first base voltage $V_{B1}$ is substantially equal to the second base voltage $V_{B2}$. As a result the duty ratio D of the drive signal 632 is less than the maximum duty ratio $D_{MAX}$.

In the example of FIG. 6, the current source 610 with input current $I_X$ is a current controlled current source which is dependent upon the controller input $I_C$ 128. The current source 610 with input current $I_X$ is proportional to the controller input $I_C$ 128. In general, if the controller input $I_C$ 128 increases then the input current $I_X$ provided by current source 610 also increases. Conversely, if the controller input $I_C$ 128 decreases then the input current $I_X$ provided by current source 610 also decreases. However, a current source 618 with offset current $I_O$ may be included such that the duty ratio provided by the drive signal 632 would follow the characteristics of the duty ratio to controller input relationship 630.

The duty ratio to controller input relationship 630 illustrates how the duty ratio D changes with the controller input $I_C$ 128. As seen in the duty ratio to controller input relationship 630, the duty ratio D is substantially equal to the maximum duty ratio $D_{MAX}$ until the controller input $I_C$ 128 reaches the offset current $I_O$. When the controller input $I_C$ 128 is greater than the offset current $I_O$, the duty ratio D decreases with an increase of the controller input $I_C$ 128. As discussed above, when the first base voltage $V_{B1}$ is greater than the second base voltage $V_{B2}$, the duty ratio D provided by the drive signal 632 is less than the maximum duty ratio $D_{MAX}$. The greater the value of the first base voltage $V_{B1}$ with respect to the second base voltage $V_{B2}$ corresponds to a smaller duty ratio D. In the example of FIG. 6, the first base voltage $V_{B1}$ is substantially equal to the second base voltage $V_{B2}$ until the controller input $I_C$ 128 is greater than the offset current $I_O$ provided by current source 618. In other words, when the controller input $I_C$ 128 is less than the offset current $I_O$ provided by current source 618, the current source 610 provides an input current $I_X$ substantially equal to zero. When input current $I_X$ is substantially equal to zero, the first base voltage $V_{B1}$ is substantially equal to the second base voltage $V_{B2}$ and the duty ratio D is substantially equal to the maximum duty ratio $D_{MAX}$. Once the controller input $I_C$ 128 is greater than the offset current $I_O$, an input current $I_X$ is provided by current source 610 such that the first base voltage $V_{B1}$ may increase to a value greater than the second base voltage $V_{B2}$ which leads to a duty ratio D which is less than the maximum duty ratio $D_{MAX}$.

With the offset current $I_O$ provided by the current source 618, the input current $I_X$ is dependent upon the difference between the controller input $I_C$ 128 and the offset current $I_O$, mathematically: $I_C - I_O$. When the controller input $I_C$ 128 is less than the offset current $I_O$, input current $I_X$ is substantially equal to zero. When the controller input $I_C$ 128 is greater than the offset current $I_O$, the input current $I_X$ is proportional to the difference between the controller input $I_C$ 128 and the offset current $I_O$. In another embodiment, when the controller input $I_C$ 128 is greater than the offset current $I_O$, the input current $I_X$ is linearly proportional to the difference between the controller input $I_C$ 128 and the offset current $I_O$. By utilizing the offset current $I_O$ provided by current source 618, the duty ratio D is substantially the maximum duty ratio $D_{MAX}$ until the controller input $I_C$ 128 is greater than the offset current $I_O$.

In addition, current source 609 provides a jitter compensated current $I_{JC}(t)$ such that the duty ratio signal $U_D$ 626 may provide a compensated duty ratio $D_{COMP}$, such as the compensated duty ratio $D_{COMP}$ of equation (10). Current source 609 receives jitter signal $U_J(t)$ 603 to produce the jitter compensated current $I_{JC}(t)$. Accounting for the current source 609, the current $I_2$ produced by the differential amplifier may be expressed as:

$$I_2 = \frac{I_A + I_{JC}(t)}{1 + e^{(V_{B1} - V_{B2})/V_T}} \quad (17)$$

Equation (17) illustrates the current $I_2$ produced by the differential amplifier from equation (16) when $I_{TAIL} = I_A + I_{JC}(t)$. For illustration purposes, the denominator of equation (17) may be considered a constant for a given value of the controller input $I_C$ 128 and equation (17) may be expressed as:

$$I_2 = n(I_A + I_{JC}(t)) \quad (18)$$

From FIG. 6, the duty ratio signal $U_D$ 626 may be expressed as:

$$U_D = V_{CC} - R1 I_2 \quad (19)$$

When there is no jitter compensated current $I_{JC}(t)$, the current $I_2 = nI_A$ and the duty ratio signal $U_D$ 626 from equation (19) without jitter compensation may be expressed as:

$$U_D = V_{CC} - R_1 n I_A \quad (20)$$

When there is jitter compensated current $I_{JC}(t)$ provided by the current source 609, the duty ratio signal $U_D$ 626 outputs the compensated duty ratio signal $U_{DCOMP}$ to the PWM 640 and the current $I_2 = n(I_A + I_{JC}(t))$ and the compensated duty ratio signal $U_{DCOMP}$ may be expressed as:

$$U_{DCOMPV} = V_{CC} - R_1 n(I_{JC}(t) + I_A) \quad (21)$$

With the sawtooth waveform 628 with the maximum voltage $V_{CC}$ 624 and a minimum voltage $V_{MIN}$, the duty ratio D may be expressed as:

$$D = \frac{V_{CC} - U_D}{V_{CC} - V_{MIN}} \quad (22)$$

By substituting the duty ratio signal $U_D$ 626 from equation (20) into equation (22), the duty ratio D may also be expressed as:

$$D = \frac{R_1 n I_A}{V_{CC} - V_{MIN}} \quad (23)$$

With the sawtooth waveform 628 with the maximum voltage $V_{CC}$ 624 and a minimum voltage $V_{MIN}$, the compensated duty ratio $D_{COMP}$ may be expressed as:

$$D_{COMP} = \frac{V_{CC} - U_{DCOMP}}{V_{CC} - V_{MIN}} \quad (24)$$

Again, by substituting the compensated duty ratio signal $U_{DCOMP}$ from equation (21) into equation (24), the compensated duty ratio $D_{COMP}$ may also be expressed as:

$$D_{COMP} = \frac{R_1 n (I_{JC}(t) + I_A)}{V_{CC} - V_{MIN}} \quad (25)$$

Utilizing the duty ratio D from equation (23), the compensated duty ratio $D_{COMP}$ may be expressed in terms of the duty ratio D:

$$D_{COMP} = D\left(1 + \frac{I_{JC}(t)}{I_A}\right) \quad (26)$$

By comparing the compensation factor $$1 + \frac{I_{JC}(t)}{I_A},$$

from equation (26) with the general compensation factor, $1+k\delta(t)$, from equation (12), the differential amplifier performs as an arithmetic operator to provide jitter compensation to the controller when:

$$\frac{I_{JC}(t)}{I_A} = k\delta(t) \quad (30)$$

As illustrated in FIG. 6, the current source 609 which provides the jitter compensated current $I_{JC}(t)$ receives the jitter signal $U_J(t)$ 603. As mentioned above, the jitter signal $U_J(t)$ 603 represents the jitter fraction $\delta(t)$ provided by jitter block 302. The current source 609 acts as the jitter compensator 308 which provides a jitter compensator signal $U_{JC}(t)$ 309. In the example of FIG. 6, the jitter compensated current $I_{JC}(t)$ is the jitter compensator signal $U_{JC}(t)$ 309 and the jitter compensated current $I_{JC}(t)$ represents the percentage amount of change $k\delta(t)$ to duty ratio D to compensate for the jitter fraction $\delta(t)$.

While the invention herein disclosed has been described by means of specific embodiments, examples and applications thereof, numerous modifications and variations could be made thereto by those skilled in the art without departing from the scope of the invention set forth in the claims.

What is claimed is:

1. A controller for use in a power supply, the controller comprising:
   a drive signal generator coupled to output a drive signal having a switching period and a duty ratio to control switching of a switch in response to an input signal to regulate an output of the power supply, the switch to be coupled to the controller;
   a jitter signal generator coupled to provide a jitter signal, wherein the switching period of the drive signal varies in response to the jitter signal;
   a compensator signal generator coupled to provide a compensator signal responsive to the jitter signal, wherein the compensator signal decreases the duty ratio of the drive signal:
   in response to the jitter signal increasing the switching period, and
   independent of the input signal; and
   an arithmetic operator coupled to adjust the input signal of the controller in response to the compensator signal to provide a compensated input signal, wherein the drive signal generator is coupled to adjust the duty ratio of the drive signal in response to the compensated input signal, wherein the jitter signal is representative of a jitter fraction $\delta(t)$ that is a percentage amount to modulate the switching period of the drive signal, and wherein the compensator signal is representative of a compensation factor substantially equal to $1+k\cdot\delta(t)$, where k is a real number.

2. The controller of claim 1, further comprising an oscillator coupled between the jitter signal generator and the drive signal generator to provide a clock signal having a switching period, wherein the switching period of the clock signal varies in response to the jitter signal and wherein the switching period of the drive signal is substantially equal to the switching period of the clock signal.

3. The controller of claim 1, wherein the input signal is a feedback signal representative of the output of the power supply.

4. The controller of claim 1, wherein the arithmetic operator comprises a multiplier, and wherein the compensated input signal is representative of the compensator signal multiplied with the input signal.

5. The controller of claim 1, wherein the drive signal generator comprises:
   a sawtooth waveform generator coupled to provide a sawtooth waveform signal having a switching period substantially equal to the switching period of the drive signal; and
   a comparator coupled to output the drive signal in response to a comparison of the sawtooth waveform signal with the compensated input signal.

6. The controller of claim 1, wherein the drive signal generator comprises:
   a latch coupled to output the drive signal, wherein the latch is further coupled to be set in response to the clock signal; and
   a comparator coupled to reset the latch in response to a comparison of a current sense signal and the compensated input signal.

7. The controller of claim 1, wherein the switch and the controller are integrated into a single monolithic integrated device.

8. The controller of claim 1, wherein the duty ratio is utilized by the controller as a control variable to regulate the output of the power supply and wherein the switching period is not utilized by the controller as a control variable to regulate the output of the power supply.

9. A power supply comprising:
an energy transfer element;
a switch coupled to the energy transfer element such that a current flows through the energy transfer element and the power switch during an on time of the switch; and
a controller coupled to provide a drive signal to control the switch to regulate an output of the power supply in response to an input signal, wherein the drive signal includes a switching period and a duty ratio, the controller comprising:
a jitter signal generator coupled to provide a jitter signal, wherein the switching period of the drive signal varies in response to the jitter signal;
a compensator signal generator coupled to provide a compensator signal responsive to the jitter signal, wherein the compensator signal decreases the duty ratio of the drive signal;
in response to the jitter signal increasing the switching period, and
independent of the input signal; and
an arithmetic operator coupled to adjust the input signal of the controller in response to the compensator signal to provide a compensated input signal, wherein a drive signal generator included in the controller is coupled to adjust the duty ratio of the drive signal in response to the compensated input signal, wherein the jitter signal is representative of a jitter fraction $\delta(t)$ that is a percentage amount to modulate the switching period of the drive signal, and wherein the compensator signal is representative of a compensation factor substantially equal to $1+k\cdot\delta(t)$, where k is a real number.

10. The power supply of claim 9, wherein the controller further comprises an oscillator coupled to the jitter signal generator to provide a clock signal having a switching period, wherein the switching period of the clock signal varies in response to the jitter signal and wherein the switching period of the drive signal is substantially equal to the switching period of the clock signal.

11. The power supply of claim 9, further comprising a feedback circuit coupled between the controller and the output of the power supply, wherein the input signal is a feedback signal representative of the output of the power supply.

12. The power supply of claim 9, wherein the arithmetic operator comprises a multiplier, and wherein the compensated input signal is representative of the compensator signal multiplied with the input signal.

13. The power supply of claim 9, wherein the drive signal generator comprises:
a sawtooth waveform generator coupled to provide a sawtooth waveform signal having a switching period substantially equal to the switching period of the drive signal; and
a comparator coupled to output the drive signal in response to a comparison of the sawtooth waveform signal with the compensated input signal.

14. The power supply of claim 9, wherein the drive signal generator comprises:
a latch coupled to output the drive signal, wherein the latch is further coupled to be set in response to the clock signal; and
a comparator coupled to reset the latch in response to a comparison of a current sense signal and the compensated input signal.

15. The power supply of claim 9, wherein the switch and the controller are integrated into a single monolithic integrated device.

16. A controller for use in a power supply, the controller comprising:
a differential amplifier having:
a first transistor having a first control terminal that is coupled to a first input of the differential amplifier; and
a second transistor having a second control terminal that is coupled to a second input of the differential amplifier, wherein the first and second transistors are coupled such that a current through the first transistor plus a current through the second transistor is a tail current of the differential amplifier;
a drive signal generator coupled to output a drive signal having a switching period and a duty ratio to control switching of a switch in response to an output of the differential amplifier;
a jitter signal generator coupled to provide a jitter signal, wherein the switching period of the drive signal varies in response to the jitter signal; and
a compensator signal generator coupled to generate a compensator signal to adjust the tail current of the differential amplifier responsive to the jitter signal to vary the duty ratio of the drive signal.

17. The controller of claim 16, wherein the compensator signal decreases the duty ratio of the drive signal in response to the jitter signal increasing the switching period.

18. The controller of claim 16, wherein the first input of the differential amplifier is coupled to receive a signal representative of an output of the power supply.

* * * * *